(12) United States Patent
Aida et al.

(10) Patent No.: US 11,104,107 B2
(45) Date of Patent: Aug. 31, 2021

(54) MULTILAYER PROPYLENE POLYMER LAMINATE

(71) Applicant: AGC Inc., Chiyoda-ku (JP)

(72) Inventors: Shigeru Aida, Chiyoda-ku (JP); Toru Sasaki, Chiyoda-ku (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/571,888

(22) Filed: Sep. 16, 2019

(65) Prior Publication Data

US 2020/0009840 A1    Jan. 9, 2020

Related U.S. Application Data

(63) Continuation of application No. PCT/JP2018/011503, filed on Mar. 22, 2018.

(30) Foreign Application Priority Data

Mar. 23, 2017 (JP) .............................. JP2017-056985

(51) Int. Cl.
*B32B 27/08* (2006.01)
*B32B 27/28* (2006.01)
*B32B 27/32* (2006.01)
*B32B 27/30* (2006.01)
*C08F 214/26* (2006.01)

(52) U.S. Cl.
CPC .............. *B32B 27/08* (2013.01); *B32B 27/28* (2013.01); *B32B 27/30* (2013.01); *B32B 27/32* (2013.01); *C08F 214/26* (2013.01); *C08F 214/265* (2013.01)

(58) Field of Classification Search
None
See application file for complete search history.

(56) References Cited

U.S. PATENT DOCUMENTS

2008/0102285 A1    5/2008   Aida et al.

FOREIGN PATENT DOCUMENTS

| JP | 2012106494 A | * | 6/2012 | ............... B32B 7/10 |
| JP | 2016-49764 A | | 4/2016 | |
| WO | WO 2006/134764 A1 | | 12/2006 | |
| WO | WO 2012/057237 A1 | | 5/2012 | |

OTHER PUBLICATIONS

Machine translation of JP 2012-106494A (Year: 2012).*
MatWeb, Overview of materials for Polypropylene, Blow Molding Grade (Year: 2020).*
International Search Report dated Jun. 19, 2018 in PCT/JP2018/011503 filed Mar. 22, 2018.

* cited by examiner

*Primary Examiner* — Ramsey Zacharia
(74) *Attorney, Agent, or Firm* — Foley & Lardner LLP

(57) ABSTRACT

To provide a fluororesin laminate in which a layer of a fluorinated copolymer and a layer of a propylene polymer excellent in heat resistance are strongly attached.
A laminate comprising a layer which contains a fluorinated copolymer having an adhesive functional group and having monomer unit based on tetrafluoroethylene and monomer units based on ethylene, and a layer which contains a propylene polymer having an adhesive functional group.

18 Claims, No Drawings

MULTILAYER PROPYLENE POLYMER LAMINATE

TECHNICAL FIELD

The present invention relates to a laminate comprising a layer of a fluorinated copolymer and a layer of a propylene polymer.

BACKGROUND ART

A fluorinated copolymer such as polytetrafluoroethylene, a tetrafluoroethylene/perfluoro(alkyl vinyl ether) copolymer or an ethylene/tetrafluoroethylene copolymer has been used in various fields of semiconductor industries, aircraft/automobile industries, etc., by virtue of excellent properties such as chemical resistance, heat resistance, weather resistance, low friction properties and electrical insulating properties.

Such a fluorinated copolymer, which has low mechanical strength and is expensive, is attempted to be formed into a laminate with e.g. other general purpose resin material which is excellent in the mechanical strength and is inexpensive. However, a fluorinated copolymer is inferior in the adhesion to other material, and it has been difficult to obtain a laminate in which a fluorinated copolymer and other material are strongly attached to each other.

Therefore, various methods for producing a laminate in which a fluorinated copolymer and other material are strongly attached have been studied. For example, Patent Document 1 discloses a technique to make a layer of a specific fluorinated copolymer and a modified polyurethane elastomer be strongly attached. Further, Patent Document 2 discloses a technique in which a layer of a specific fluorinated copolymer and a thermoplastic resin are laminated via an ethylene copolymer having an adhesive functional group.

PRIOR ART DOCUMENTS

Patent Documents

Patent Document 1: WO2006/134764
Patent Document 2: JP-A-2016-49764

DISCLOSURE OF INVENTION

Technical Problem

However, according to the technique disclosed in Patent Document 1, although a laminate of a layer of a fluorinated copolymer and a layer comprising a modified polyurethane elastomer can be obtained, mechanical properties and heat resistance are not necessarily sufficient. Further, according to the technique disclosed in Patent Document 2, although a laminate in which a layer of a fluorinated copolymer and a thermoplastic resin are attached via an ethylene copolymer having an adhesive functional group can be obtained, the ethylene copolymer to be an adhesive layer has low heat resistance.

Under these circumstances, it is an object of the present invention to provide a laminate in which a layer of a fluorinated copolymer and a layer of a propylene polymer are strongly attached, and which is excellent in various mechanical properties and heat resistance.

Solution to Problem

The present inventors have conducted extensive studies to achieve the above object and as a result, found that by using a fluorinated copolymer having an adhesive functional group and a propylene polymer having an adhesive functional group, a fluororesin laminate (laminate) in which a layer of the fluorinated copolymer and a layer of the propylene polymer are strongly attached can be obtained, and accomplished the present invention.

The present invention provides the following.

[1] A laminate comprising a layer which contains a fluorinated copolymer having an adhesive functional group and having monomer units based on tetrafluoroethylene and monomer units based on ethylene, and a layer which contains a propylene polymer having an adhesive functional group different from that of the fluorinated copolymer.

[2] The laminate according to [1], wherein the adhesive functional group of the fluorinated copolymer is a carbonyl group-containing group.

[3] The laminate according to [1] or [2], wherein the adhesive functional group of the propylene polymer is an imino group or a carbodiimide group.

[4] The laminate according to any one of [1] to [3], wherein the propylene polymer has a melting point of at most 220° C.

[5] The laminate according to any one of [1] to [4], wherein the fluorinated copolymer has a melting point of at least 120° C.

[6] The laminate according to any one of [1] to [5], wherein the molar ratio of the monomer units based on tetrafluoroethylene to the monomer units based on ethylene is from 25/75 to 80/20.

[7] The laminate according to any one of [1] to [6], wherein the amount of monomer units having the adhesive functional group contained in the fluorinated copolymer is from 0.01 to 5 mol % based on the total amount of monomer units contained in the fluorinated copolymer.

[8] The laminate according to any one of [3] to [7], wherein the content of the imino group or the carbodiimide group is from 0.1 to 50 mmol per 100 g of the propylene polymer.

[9] The laminate according to any one of [1] to [8], wherein the fluorinated copolymer is a copolymer such that a temperature at which the volume flow rate is from 0.1 to 1,000 mm$^3$/sec is present at a temperature higher by from 20 to 50° C. than its melting point.

[10] The laminate according to any one of [1] to [9], wherein the fluorinated copolymer further has monomer units based on other monomer.

[11] The laminate according to any one of [1] to [10], wherein the layer which contains the propylene polymer has other resin layer on the opposite side from the layer which contains the fluorinated copolymer.

[12] The laminate according to [11], wherein the resin of other resin layer is polypropylene.

Advantageous Effects of Invention

According to the present invention, it is possible to obtain a laminate in which a layer of a fluorinated copolymer and a layer of a propylene polymer are strongly attached.

DESCRIPTION OF EMBODIMENTS

In this specification, meanings of the following terms are as follows.

The "melting point" is a temperature corresponding to the top of a crystal melting peak which appears when about 5 mg of a sample is held in a dry air stream at 300° C. for 10 minutes, its temperature is decreased at a temperature-decreasing rate of 10° C./min to 100° C., and then it is heated to 300° C. at a heating rate of 10° C./min, using a differential scanning calorimeter.

An "acid anhydride group" means a group represented by —C(=O)—O—C(=O)—.

A "monomer unit" means an atomic group derived from one molecule of a monomer formed by polymerization of the monomer. The monomer unit may be an atomic group directly formed by the polymerization reaction, or may be a unit atomic group having part of the unit converted to another structure by treating the polymer.

In the laminate in the present invention, the fluorinated copolymer (hereinafter sometimes referred to as copolymer (1)) having an adhesive functional group (hereinafter sometimes referred to as functional group (F)) has monomer units based on tetrafluoroethylene (hereinafter sometimes referred to as TFE units) and monomer units based on ethylene (hereinafter sometimes referred to as E units) in addition to the functional group (F).

The molar ratio [TFE/E] of the TFE units to the E units is preferably from 25/75 to 80/20, preferably from 40/60 to 65/35, more preferably from 42/58 to 63/37, most preferably from 45/55 to 61/39. When the molar ratio [TFE/E] is at most the upper limit value of the above range, the copolymer (1) is more excellent in the mechanical strength, and when it is at least the lower limit value of the above range, the copolymer (1) is more excellent in the heat resistance. When the molar ratio [TFE/E] is within the above range, the copolymer (1) is excellent in both mechanical strength and heat resistance.

The copolymer (1) may be produced e.g. by copolymerizing a monomer having the functional group (F) at the time of polymerization of the monomer, or by polymerizing a monomer using a chain transfer agent or a polymerization initiator which brings the functional group (F).

The monomer having the functional group (F) is preferably a monomer having a carbonyl group-containing group, a hydroxy group, an epoxy group, an amide group, an amino group or an isocyanate group. The carbonyl group-containing group is preferably an acid anhydride group or a carboxy group. Specifically, a monomer having a carboxy group, such as maleic acid, itaconic acid, citraconic acid or undecylenic acid, a monomer having an acid anhydride group, such as itaconic anhydride (hereinafter sometimes referred to as IAH), citraconic anhydride (hereinafter sometimes referred to as CAH), 5-norbornene-2,3-dicarboxylic anhydride (hereinafter sometimes referred to as NAH) or maleic anhydride, a hydroxyalkyl vinyl ether or an epoxyalkyl vinyl ether may, for example, be mentioned.

The chain transfer agent which brings the functional group (F) is preferably a chain transfer agent having a carboxy group, an ester bond, a hydroxy group or the like. Specifically, acetic acid, acetic anhydride, methyl acetate, ethylene glycol or propylene glycol may, for example, be mentioned.

The polymerization initiator which brings the functional group (F) is preferably a peroxide such as a peroxycarbonate, diacyl peroxide or a peroxyester. Specifically, di-n-propyl peroxydicarbonate, diisopropyl peroxycarbonate, tert-butyl peroxyisopropylcarbonate, bis(4-tert-butylcyclohexyl) peroxydicarbonate or di-2-ethylhexyl peroxydicarbonate may, for example, be mentioned.

To produce the copolymer (1), preferred is a method of copolymerizing the monomer having the functional group (F) to produce a copolymer having the monomer unit thereby to obtain a fluorinated copolymer having the functional group (F). Further, the monomer having the functional group (F) is preferably itaconic anhydride (hereinafter referred to as IAH), 5-norbornene-2,3-dicarboxylic anhydride (hereinafter referred to as NAH) or citraconic anhydride (hereinafter referred to as CAH).

The amount of the monomer units (hereinafter sometimes referred to as F units) based on the monomer having the functional group (F) contained in the copolymer (1) is from 0.01 to 5 mol %, preferably from 0.03 to 3 mol %, more preferably from 0.05 to 1 mol % based on the total amount of monomer units contained in the copolymer (1).

When the amount of the F units is within the above range, the copolymer (1) is excellent in the chemical resistance and the heat resistance. When the amount of the E units is within the above range, the copolymer (1) is excellent in the chemical resistance and the heat resistance. When the amount of the F units is within the above range, the copolymer (1) is excellent in the adhesion to other layer.

The F units may be used alone or in combination of two or more. When the F units are used in combination of two or more, their total amount is preferably within the above range.

The copolymer (1) preferably has, in addition to the TFE units, the E units and the F units, monomer unit (hereinafter sometimes referred to as D units) based on other monomer, whereby the melting point of the copolymer (1) is lowered and is easily controlled to be within the above range.

Other monomer constituting the D units is a monomer other than TFE, ethylene, IAH, NAH and CAH, and may be a fluorinated monomer or a non-fluorinated monomer. Such other monomer may be used alone or in combination of two or more.

The fluorinated monomer is a monomer having a fluorine atom, other than TFE, and may, for example, be a fluorinated olefin such as vinyl fluoride, vinylidene fluoride (hereinafter sometimes referred to as VDF), trifluoroethylene, hexafluoropropylene (hereinafter sometimes referred to as HIP), chlorotrifluoroethylene, $CH_2=CH(CF_2)_{Q1}F$ (wherein Q1 is an integer of from 2 to 10) or $CH_2=CF(CF_2)_{Q2}H$ (wherein Q2 is an integer of from 2 to 10), a fluoro(alkyl vinyl ether) such as $CF_2=CFOR^1$ (wherein $R^1$ is a $C_{1-10}$ fluoroalkyl group which may contain an etheric oxygen atom), $CF_2=CFOR^2SO_2X^1$ (wherein $R^2$ is a $C_{1-10}$ fluoroalkylene group which may contain an etheric oxygen atom, and $X^1$ is a halogen atom or a hydroxy group), $CF_2=CFOR^3CO_2X^2$ (wherein $R^3$ is a $C_{1-10}$ fluoroalkylene group which may contain an etheric oxygen atom, and $X^2$ is a hydrogen atom or an alkyl group having at most 3 carbon atoms), $CF_2=CF(CF_2)_POCF=CF_2$ (wherein P is 1 or 2), or perfluoro(2-methylene-4-methyl-1,3-dioxolane). The fluorinated monomer may be linear or branched. Further, the fluorinated monomer may be used alone or in combination of two or more.

$R^1$ to $R^3$ are each preferably a $C_{1-10}$ fluoroalkyl group.

The number of carbon atoms in the fluoroalkyl group in each of $R^1$ to $R^3$ is preferably from 1 to 6, more preferably from 1 to 4. The fluoroalkyl group is particularly preferably a perfluoroalkyl group such as a $CF_3$ group, a $C_2F_5$ group or a $C_3F_7$ group.

$Q^1$ in $CH_2=CH(CF_2)_{Q1}F$ is preferably an integer of from 2 to 6 in view of polymerizability and continuous operation.

As specific examples of $CF_2=CFOR^1$, $CF_2=CFOCF_3$, $CF_2=CFOCF_2CF_3$, $CF_2=CFOCF_2CF_2CF_3$, $CF_2=CFOCF_2CF_2CF_2CF_3$ and $CF_2=CFO(CF_2)_8F$ may, for example, be mentioned, and $CF_2=CFOCF_2CF_2CF_3$ is preferred.

As specific examples of $CH_2=CF(CF_2)_{Q2}H$, $CH_2=CF(CF_2)_3H$ and $CH_2=CF(CF_2)_4H$ may, for example, be mentioned.

The non-fluorinated monomer is a monomer having no fluorine atom, other than ethylene and the monomer having the functional group (F), and may, for example, be a vinyl ether such as methyl vinyl ether, ethyl vinyl ether, butyl vinyl ether, tert-butyl vinyl ether, methoxyethyl vinyl ether or ethoxyethyl vinyl ether; or an α-olefin such as propylene, butene or isobutene. The non-fluorinated monomer may be used alone or in combination of two or more.

In view of the heat resistance of the copolymer (1), as other monomer constituting the D units, a fluorinated monomer is preferably used.

As the fluorinated monomer, HFP is preferably used. When the D units include monomer units based on HFP (hereinafter sometimes referred to as HFP units), the melting point of the copolymer (1) can easily be controlled to be within a preferred range, without decreasing the heat resistance.

As the fluorinated monomer constituting the D units, it is more preferred to use the above-described HFP and at least one member selected from the group consisting of VDF, $CF_2=CFOR^1$, $CH_2=CH(CF_2)_{Q1}F$ and $CH_2=CF(CF_2)_{Q2}H$ in combination, and it is most preferred to use HFP and $CH_2=CH(CF_2)_{Q1}F$ (hereinafter sometimes referred to as FAE) in combination. When the D units include the HFP units and monomer units based on FAE (hereinafter sometimes referred to as FAE units), the melting point of the copolymer (1) is easily controlled to be within the above range by containing the HFP units.

Further, by containing the FAE units, the melting point of the copolymer (1) is easily controlled to be within a preferred range and in addition, excellent stress crack resistance and forming properties will be obtained.

Further, by containing the HFP units and the FAE units, favorable productivity of the copolymer (1) can be maintained.

The molar ratio of the TFE units to the D units [TFE/D] is preferably from 60/40 to 99.9/0.1, more preferably from 65/35 to 98/2, most preferably from 68/32 to 95/5.

When the molar ratio [TFE/D] is at most the upper limit value of the above range, the melting point of the copolymer (1) is lowered and is easily controlled to be within the above-described range. When the molar ratio [TFE/D] is at least the lower limit value of the above range, the copolymer (1) is more excellent in chemical resistance and heat resistance.

When the D units include the HFP units and the FAE units, the molar ratio of the HFP units to the FAE units [HFP/FAE] is preferably from 75/25 to 97/3, more preferably from 80/20 to 96/4, most preferably from 85/15 to 95/5.

When the molar ratio [HFP/FAE] is at most the upper limit value of the above range, the copolymer (1) is more excellent in the stress crack resistance and forming property. When the molar ratio [HFP/FAE] is at least the lower limit value of the above range, the melting point of the copolymer (1) is more easily controlled to be within a preferred range.

As the copolymer (1), the following copolymers (a) to (e) may be mentioned, and among them, the following copolymer (e) is preferred.
  (a) TFE units/E units/F units,
  (b) TFE units/E units/F units/HFP units,
  (c) TFE units/E units/F units/monomer units based on propylene (hereinafter sometimes referred to as P units),
  (d) TFE units/E units/F units/FAE units/P units,
  (e) TFE units/E units/F units/HFP units/FAE units.

When the copolymer (1) has the HFP units, the molar ratio of all the monomer units (hereinafter sometimes referred to as M1) constituting the copolymer (1) other than the HFP units to the HFP units [M1/HEP] is preferably from 85/15 to 94/6, more preferably from 90/10 to 93/7. When the molar ratio [M1/HEP] is at most the upper limit value of the above range, the copolymer (1) does not have a too high melting point and is excellent in the forming property. When the molar ratio [M1/HEP] is at least the lower limit value of the above range, the polymerization reaction at the time of producing the copolymer (1) will proceed without any problem, thus leading to excellent productivity and in addition, the resulting copolymer (1) is more excellent in the heat resistance and the forming property. When the molar ratio [M1/HEP] is within the above range, the copolymer (1) is excellent in the productivity, the heat resistance and the forming property.

When the copolymer (1) has the P units, the ratio of all the monomer units (hereinafter sometimes referred to as M2) constituting the fluorinated copolymer (1) other than the P units to the P units [M2/P] is preferably from 80/20 to 94/6, more preferably from 85/15 to 93/7. When the molar ratio [M2/P] is at most the upper limit value of the above range, the copolymer (1) does not have a too high melting point and is excellent in the forming property, and when the molar ratio [M2/P] is at least the lower limit value of the above range, the polymerization reaction for the copolymer (1) will proceed without any problem, thus leading to excellent productivity and in addition, the resulting fluorinated copolymer (1) is more excellent in the heat resistance and the forming property.

The melting point of the copolymer (1) is preferably from 100 to 220° C., more preferably from 120 to 205° C., most preferably from 150 to 200° C. When the melting point of the copolymer (1) is at most the upper limit value of the above range, the temperature in a heat lamination step in production of a laminate of a layer (I) containing the copolymer (1) and a layer (II) containing the after-described propylene polymer having an adhesive functional group can be made low, for example, from 150 to 260° C., the detail of which will be described hereinafter. Accordingly, heat decomposition of the propylene polymer having an adhesive functional group at the time of producing the laminate can be suppressed, and when the melting point of the copolymer (1) to obtain a laminate in which the layer (II) is strongly attached to the layer (I) is at least the lower limit value of the above range, the copolymer (1) is excellent in the heat discoloration resistance.

The melting point of the copolymer (1) can be adjusted e.g. by the content of the D units, and when the D units are contained in a larger amount, the melting point of the copolymer (1) tends to be low.

The fluorinated copolymer (1) is a copolymer such that a temperature at which the volume flow rate (hereinafter sometimes referred to as Q value) is from 0.1 to 1,000 mm$^3$/sec is present at a temperature higher by from 20 to 50° C. than its melting point. The copolymer (1) is preferably a copolymer such that the Q value is from 0.1 to 500 mm$^3$/sec, more preferably from 1 to 200 mm$^3$/sec, most preferably from 5 to 100 mm$^3$/sec, is present at a temperature higher by from 20 to 50° C. than its melting point. The Q value is a measure of the molecular weight.

When the Q value is at least the lower limit value of the above range, the copolymer (1) is excellent in the forming property. When the Q value is at most the upper limit value of the above range, a fluororesin laminate having a layer which contains the copolymer (1) (the laminate of the present invention) has excellent strength for practical use.

Here, the Q value is a value measured with respect to the copolymer (1) as an object to be measured, at a temperature higher by from 20 to 50° C. than the melting point under a load of 68.6 N. Specifically, it is a rate (mm³/sec) of a resin which flows out from a nozzle having a diameter of 2.1 mm and a length of 8 mm by a Koka type flow tester.

The Q value of the copolymer (1) used in the after-described Examples is a value measured at a temperature of 220° C. under a load of 68.6 N.

The method for producing the copolymer (1) is not particularly limited, and a method may be employed in which TFE, ethylene, at least one type of a monomer having the functional group (F) and other monomer used as the case requires are charged into a reactor and copolymerized by using a known radical polymerization initiator. For example, the copolymer (1) may be produced in accordance with the polymerization method as described in Patent Document 1.

Specifically, it may be produced by known bulk polymerization; solution polymerization using an organic solvent such as a fluorinated hydrocarbon, a chlorinated hydrocarbon, a chlorofluorohydrocarbon, an alcohol or a hydrocarbon; suspension polymerization using an aqueous medium and as the case requires, a proper organic solvent; or emulsion polymerization using an aqueous medium and an emulsifier, and is produced preferably by solution polymerization. Polymerization may be conducted by e.g. a single tank or multiple tank agitation type polymerization vessel or a tube polymerization vessel by batch or continuous operation.

The adhesive functional group (hereinafter sometimes referred to as functional group (F2)) which the propylene polymer having an adhesive functional group (hereinafter sometimes referred to as polymer (2)) has is preferably a group reactive with the functional group (F) which the copolymer (1) has. It is particularly preferably an imino group or a carbodiimide group.

The polymer (2) may be produced e.g. by a method of copolymerizing a monomer having the functional group (F2) at the time of polymerization of the monomer, or by polymerizing a monomer using a chain transfer agent or polymerization initiator which brings the functional group (F2), in the same manner as in the case of the copolymer (1). It is particularly preferred that a monomer having the functional group (F2) is copolymerized to produce a copolymer having the monomer units thereby to obtain the polymer (2), or a propylene polymer having no functional group and a monomer or polymer having the functional group (F2) are kneaded and reacted e.g. by a twin screw extruder to graft the functional group (F2) to the polypropylene polymer.

In the present invention, as a specific method for introducing an imino group or a carbodiimide group to the propylene polymer, it is preferred to react a compound having an imino group or carbodiimide group with a propylene polymer having a functional group reactive with an imino group or a carbodiimide group.

In the polymer (2), the content of the compound having an imino group or carbodiimide group is such that the content of the functional group is preferably from 0.1 to 50 mmol, more preferably from 0.2 to 40 mmol, most preferably from 0.5 to 30 mmol per 100 g of the propylene polymer. When the content of the imino group or carbodiimide group is within the above range, the polymer (2) is excellent in the balance of the heat resistance, mechanical properties and adhesion.

The imino group or carbodiimide group contained in the polymer (2) may be detected by infrared spectroscopy. The peak attributable to an imino group or carbodiimide group in the infrared spectroscopy is detected at 2,120 cm$^{-1}$. The ratio (percentage) of the absorbance of the peak attributable to the imino group or carbodiimide group to the absorbance of a peak detected at 1,460 cm$^{-1}$ attributable to CH$_2$ of propylene is preferably at most 50%, more preferably at most 30%. When the absorbance ratio is within the above range, excess free imino groups or free carbodiimide groups will not be present, and excellent adhesion and forming processability will be achieved.

The propylene polymer having a functional group reactive with the imino group or carbodiimide group is preferably a propylene polymer obtained by graft polymerization of maleic anhydride.

The layer (II) which contains the polymer (2) may contain components other than the polymer (2) in an amount of less than 20 mass %. As components other than the polymer (2), for example, a rubber, a thermoplastic elastomer, a modifying agent such as an ethylene copolymer other than the polymer (2); or an additive such as a heat stabilizer, a lubricant or a pigment.

The ethylene copolymer other than the polymer (2) is preferably an ethylene/propylene copolymer in view of excellent compatibility with the polymer (2).

The thermoplastic elastomer may, for example, be an olefin-based TPO (thermoplastic polyolefin-based elastomer) in view of excellent compatibility with the propylene polymer having an adhesive functional group.

The polymer (2) is excellent in balance of the heat resistance and the mechanical properties. Accordingly, by laminating a layer which contains the polymer (2) and a layer which contains the copolymer (1), it is possible to obtain a laminate excellent in the heat resistance and the mechanical properties.

The laminate of the present invention is a laminate [(I)/(II)] comprising a layer which contains the copolymer (1) (hereinafter sometimes referred to as layer (I)) and a layer which contains the polymer (2) (hereinafter sometimes referred to as layer (II)) laminated.

The layer (I) preferably contains the copolymer (1) in an amount of at least 50 mass %, more preferably at least 75 mass %, further preferably at least 90 mass %.

The laminate of the present invention may be a laminate which further has at least one other layer laminated on the layer (II) on the opposite side (outside) from the layer (I). For example, it may be a laminate [(I)/(II)/(II)] in which one other resin layer (III) is laminated on the outside of the layer (II), or a laminate [(I)/(II)/(III)/(IV)] in which a resin layer (III) and a resin layer (IV) are laminated. In the laminate of the present invention, the total number of layers is not particularly limited so long as it has a laminate [(I)/(II)].

The layer (I) and the layer (II) are very strongly attached to each other by lamination with heating. The very strong adhesion is considered to be because the F units in the copolymer (1) forming the layer (I) and the F2 units in the polymer (2) forming the layer (II) are bonded by any reaction at the lamination interface.

Further, in a case where the melting point of the copolymer (1) forming the layer (I) is so low as from 100 to 220° C., the temperature at the time of producing the laminate [(I)/(II)] can be made low, for example, from 150 to 260° C. Accordingly, at the time of producing the laminate, heat decomposition of the polymer (2) used for the layer (II) is suppressed, and the layer (II) is strongly attached to the layer (I).

Further, in the case of a laminate [(I)/(II)/(III)] in which other resin layer (III) is laminated on the outside of the layer (II), the layer (II) functions as an adhesive layer, and the laminate [(I)/(II)] and other resin layer (III) are strongly attached.

The resin forming the resin layer (resin layer (III), resin layer (IV), and so on) to be laminated on the outside of the layer (II) is not particularly limited. It may, for example, be a simple substance or a mixture of polyethylene (high density polyethylene, medium density polyethylene, low density polyethylene or ultra low density polyethylene), polypropylene, polybutene, polybutadiene, an ABS resin, polystyrene, a methacrylic resin, a norbornene resin, polyvinyl chloride, polyvinylidene chloride, a polyester such as polybutylene terephthalate, polyethylene naphthalate or polyethylene terephthalate, polycarbonate, polyvinyl alcohol (PVOH), polyethylene vinyl alcohol (EVOH), polyamide, a polyamide elastomer, thermoplastic polyurethane (TPU), a thermoplastic elastomer (TPE), polyimide, thermoplastic polyimide, polyaminobismaleimide, polysulfone, polyphenylene sulfide, polyether ether ketone, polyetherimide, polyetherketone, polyethersulfone, polythioethersulfone, polyether nitrile, polyphenylene ether, a thermosetting epoxy resin, a urethane resin, a urea resin, a phenol resin, a melamine resin, a guanamine resin, a furan resin or a diallyl phthalate resin.

Further, the resin forming the above other resin layer may contain, in addition to the resin as the matrix, carbon black, an elastomer component, glass fibers, carbon fibers or the like.

The thickness of each layer in the fluororesin laminate (the laminate of the present invention) is not particularly limited, and for example, the thickness of the layer (I) is at a level of from 3 to 2,000 μm, and the thickness of the layer (II) is at a level of from 2 to 50,000 μm. Further, the ratio of each layer is not particularly limited, and for example, to the entire thickness, the ratio of the thickness of the layer (I) is from 0.1 to 99.9%, and the ratio of the thickness of the layer (II) is from 0.1 to 99.9%.

The total thickness of the laminate of the present invention (that is, the total thickness of the layer (I) and the layer (II), excluding thicknesses of additional layers) is not particularly limited and may, for example, from 50 to 50,000 μm, preferably from 100 to 30,000 μm.

The laminate of the present invention may be in a sheet shape, a steric shape having a sheet sterically formed, a tube shape or the like, and the shape is not limited.

The laminate of the present invention may be suitably produced in view of forming simplicity and productivity by a method comprising a heat lamination step such as multilayer extrusion (co-extrusion), extrusion lamination, multilayer lamination using a heating roll or heat pressing, multilayer injection molding or multilayer blow molding.

Specifically, a method may be mentioned in which the layer (I) and the layer (II) and other layer provided as the case requires are laminated and attached to form a laminate by a single stage heat lamination step such as multilayer extrusion or multilayer lamination. Otherwise, for example, a method may be mentioned in which the layer (II) is heat-laminated to the layer (I) by heat pressing.

At the time of heat lamination, the heat lamination step of laminating the layer (I) and the layer (II) with heating is carried out preferably at from 150 to 260° C., more preferably at from 180 to 250° C. When the temperature in the heat lamination step is at least the lower limit value of the above range, the layers can be sufficiently attached. When the temperature is at most the upper limit value of the above range, heat decomposition of the propylene polymer having an adhesive functional group constituting the layer (II) is suppressed, and sufficient adhesion is achieved.

The heating retention time in the heat lamination step is preferably from 0.1 second to 1 hour. When it is at least 0.1 second, the adhesion is stable, and when it is at most 1 hour, excellent productivity is achieved. The heat lamination step may be carried out in the air, in an inert gas or under reduced pressure. For example, for the purpose of suppressing heat decomposition of the repeating units (F) in the polymer (2) forming the layer (II), the heat lamination step is carried out preferably in an inert gas or under reduced pressure.

In the laminate of the present invention, when the copolymer (1) having a melting point within a specific range is used, heat decomposition of the layer (II) in the production step is suppressed, and the two layers are strongly attached.

EXAMPLES

Now, the present invention will be described in further detail with reference to Examples. However, it should be understood that the present invention is by no means restricted thereto. "%" means "mass %" unless otherwise specified.

Measurements and tests in Examples were carried out as follows.
[Melting Point]
It was measured by a differential scanning calorimeter (manufactured by Seiko Instruments Inc., DSC-7020).
[Composition of Copolymer (1) Having Adhesive Functional Group]
It was obtained by molten NMR analysis, fluorine content analysis and infrared absorption spectrometry.
[Peel Test]
Each resin was formed into a film having a thickness of 200 μm, and two types or three types of resin films were overlaid and heat-pressed, and the peel strength between layers was measured. As heat pressing conditions, the layers were preheated at 220° C. for 2 minutes and pressed under a pressure of 5 MPaG and kept for 2 minutes, to attach the layers.

Preparation Example 1

A stainless steel polymerization vessel having an internal capacity of 1.3 L, equipped with a stirring machine and a jacket, was evacuated of air, 825 g of $CF_3CH_2OCF_2CF_2H$ and 3.2 g of $CH_2=CH(CF_2)_4F$ were charged, 350 g of HFP, 118 g of TFE and 2.9 g of E were charged while the interior of the polymerization vessel was stirred, and warm water was made to flow through the jacket to keep the internal temperature of the polymerization vessel to 66° C. At this point, the pressure in the polymerization vessel was 1.47 MPaG. After the internal temperature was stabilized, 7.4 mL of a 5 mass % $CF_3CH_2OCF_2CF_2$ H solution of tert-butyl peroxypivalate was injected to initiate the polymerization. During the polymerization, a mixed gas of TFE/E=54/46 by molar ratio was added so that the internal pressure would be constant at 1.47 MPaG. In addition, 2 mL of a $CF_3CH_2OCF_2CF_2H$ solution containing 7.1 mass % of $CH_2=CH(CF_2)_4F$ and 1.3 mass % of itaconic anhydride, was added every consumption of 5 g of the TFE/E mixed gas added during the polymerization. 370 Minutes after initiation of the reaction, at a point when 70 g of the mixed gas of TFE/E=54/46 by molar ratio was added, the polymerization vessel was cooled to terminate the polymerization.

The remaining monomer gas was purged to atmospheric pressure from the polymerization vessel, the slurry was put in a container having an internal capacity of 2L, water in the same volume as the slurry was added, and the polymerization medium, the remaining monomer and the resulting fluorinated copolymer were separated with stirring. The obtained polymer was dried in an oven at 120° C. to obtain white powdery copolymer F-1. The copolymer F-1 corresponds to the copolymer (1).

The volume flow rate of the copolymer F-1 at 220° C. was 11 mm$^3$/sec, the composition (mol %) was TFE/E/HFP/CH$_2$=CH(CF$_2$)$_4$ F/itaconic anhydride=47.5/43.4/8.3/0.6/0.3, and the melting point was 183° C.

Example 1

A sheet (thickness: 200 μm) of the copolymer F-1 obtained in Preparation Example 1 and polypropylene polymer P-1 (thickness: 200 μm) having an adhesive functional group were preheated at a temperature of 220° C. for 2 minutes and heat-pressed under a pressure of 5 MPaG, and then kept for 2 minutes to produce a laminate. A peel test was conducted to determine the peel strength at the interface between the layer [I] and the layer [II] in the laminate. The results are shown in the following Table 1.

Here, the polypropylene polymer P-1 corresponds to the polymer (2), and had a melting flow rate (MFR) at 230° C. of 2.4 g/10 min, a polymer composition (mol %) excluding components having an imino group of propylene/ethylene/1-butene=83/16/1, a specific gravity of 0.89, a melting point of 144° C., and an absorbance ratio of a peak at 2,120 cm$^{-1}$ to a peak at 1,460 cm$^{-1}$ in an infrared spectroscopy of 11%.

Example 2

A laminate was produced in the same manner as in Example 1 except that a sheet (thickness: 200 μm) of polypropylene PP-1 (manufactured by Primer Polymer Co., Ltd., F219DA) was further laminated as layer [III] outside the layer [II]. The laminate was subjected to the peel test. The results are shown in Table 1.

Example 3

A laminate was produced in the same manner as in Example 2 except that a sheet (thickness: 200 μm) of TPU-1 (manufactured by BASF, Elastollan 1190A10TR) was laminated instead of PP-1 as the layer [III]. The laminate was subjected to the peel test. The results are shown in Table 1.

Example 4

A laminate was produced in the same manner as in Example 2 except that a sheet (thickness: 200 μm) of TPU-2 (manufactured by BASF, Elastollan ET590-10) was laminated instead of PP-1 as the layer [III]. The laminate was subjected to the peel test. The results are shown in Table 1.

Example 5

A laminate was produced in the same manner as in Example 2 except that a sheet (thickness: 200 μm) of PC-1 (manufactured by Mitsubishi Engineering-Plastic Corporation, lupilon H-3000) was laminated instead of PP-1 as the layer [III]. The laminate was subjected to the peel test. The results are shown in Table 1.

Example 6

A laminate was produced in the same manner as in Example 2 except that a sheet (thickness: 200 μm) of PET-1 (manufactured by TEIJIN LIMITED, Tetoron G2) was laminated instead of PP-1 as the layer [III]. The laminate was subjected to the peel test. The results are shown in Table 1.

Example 7

A laminate was produced in the same manner as in Example 2 except that a sheet (thickness: 200 μm) of EVOH-1 (manufactured by Kuraray Co., Ltd., Eval F101 B) was laminated instead of PP-1 as the layer [III]. The laminate was subjected to the peel test. The results are shown in Table 1.

Comparative Example 1

A laminate was produced in the same manner as in Example 1 except that the sheet (thickness: 200 μm) of PP-1 used as the layer [III] in Example 2 was laminated instead of P-1 as the layer [II]. The laminate was subjected to the peel test. The results are shown in Table 1.

TABLE 1

| | Layer | | | Peel strength (N/cm) | |
| --- | --- | --- | --- | --- | --- |
| | [I] | [II] | [III] | [I]-[II] interface | [II]-[III] interface |
| Example 1 | F-1 | P-1 | — | 34 | — |
| Example 2 | F-1 | P-1 | PP-1 | 35 | Material fracture |
| Example 3 | F-1 | P-1 | TPU-1 | 35 | 42 |
| Example 4 | F-1 | P-1 | TPU-2 | 35 | 40 |
| Example 5 | F-1 | P-1 | PC-1 | 35 | 24 |
| Example 6 | F-1 | P-1 | PET-1 | 35 | 20 |
| Example 7 | F-1 | P-1 | EVOH-1 | 35 | 58 |
| Comparative Example 1 | F-1 | PP-1 | — | Not attached | — |

As shown in Table 1, the adhesion at the interface between the layer [I] and the layer [II] and at the interface between the layer [II] and the layer [III] in the laminate in each of Example 1 to 7 is favorable.

INDUSTRIAL APPLICABILITY

The fluororesin laminate of the present invention is excellent in weather resistance, electrical insulating properties, acid/alkali resistance, chemical resistance and mechanical strength, and is useful in a wide range of applications as e.g. a film, a sheet, a hose, a tube, a tank, a bottle, etc.

Examples of its application are shown below.

In application for moving objects such as automobiles, ships, aircraft, construction equipment and vehicles, a fuel hose, a fuel supply line hose, a fuel return line hose, a vapor line hose, a filler neck hose, an in-tank hose, a lubricating/cooling hose, an oil hose, a transmission fluid hose, a break oil hose, an engine oil hose, a cooling water hose, a coolant hose, an air-conditioning refrigerant hose, an air hose, an exhaust line hose, a turbo hose, an automobile liquid tank, a fuel tank, a urea tank, an oil tank, a coolant tank, a cooling water tank, a washer liquid tank, etc.

In other industrial applications, films, sheets, hoses, tubes, tanks, bottles, etc. used in e.g. food industry, beverages, industrial machine, chemical plants, semiconductor production.

This application is a continuation of PCT Application No. PCT/JP2018/011503, filed on Mar. 22, 2018, which is based upon and claims the benefit of priority from Japanese Patent Application No. 2017-056985 filed on Mar. 23, 2017. The contents of those applications are incorporated herein by reference in their entireties.

What is claimed is:

1. A laminate comprising:
a layer which contains a fluorinated copolymer having an adhesive functional group and having monomer units based on tetrafluoroethylene and monomer units based on ethylene; and
a layer which contains a propylene polymer having an adhesive functional group different from that of the fluorinated copolymer;
wherein:
the fluorinated copolymer further comprises monomer units based on one or more other monomers, and the molar ratio of tetrafluoroethylene to the one or more other monomers is from 68/32 to 95/5; and
the adhesive functional group of the fluorinated copolymer is an acid anhydride group; and wherein the adhesive functional group of the propylene polymer is an imino group or a carbodiimide group.

2. The laminate according to claim 1, wherein the fluorinated copolymer has a melting point of at most 220° C.

3. The laminate according to claim 1, wherein the propylene polymer has a melting point of at least 120° C.

4. The laminate according to claim 1, wherein the molar ratio of the monomer units based on tetrafluoroethylene to the monomer units based on ethylene is from 25/75 to 80/20.

5. The laminate according to claim 1, wherein the amount of monomer units having the adhesive functional group contained in the fluorinated copolymer is from 0.01 to 5 mol % based on the total amount of monomer units contained in the fluorinated copolymer.

6. The laminate according to claim 1, wherein the content of the imino group or the carbodiimide group is from 0.1 to 50 mmol per 100 g of the propylene polymer.

7. The laminate according to claim 1, wherein the fluorinated copolymer is a copolymer such that a temperature at which the volume flow rate is from 0.1 to 1,000 mm³/sec is present at a temperature higher by from 20 to 50° C. than its melting point.

8. The laminate according to claim 1, wherein the layer which contains the propylene polymer has other resin layer on the opposite side from the layer which contains the fluorinated copolymer.

9. The laminate according to claim 8, wherein the resin of other resin layer is polypropylene.

10. The laminate according to claim 1 wherein the functional group is selected from the group comprising itaconic anhydride, 5-norbornene-2,3-dicarboxylic anhydride, and citraconic anhydride.

11. The laminate according to claim 1 wherein the one or more other monomer is not selected from the group consisting of IAH, NAH, and CAH.

12. The laminate according to claim 1 wherein the one or more other monomers comprises a fluorinated monomer.

13. The laminate according to claim 1 wherein the one or more other monomer comprises hexafluoropropylene (HFP).

14. The laminate according to claim 1 wherein the one or more other monomers comprises one member selected from the group consisting of VDF, $CF_2=CFOR^1$, $CH_2=CH(CF_2)_{Q1}F$, and $CH_2=CF(CF_2)_{Q2}H$, wherein $R^1$ is a $C_{1-10}$ fluoroalkylene group which may contain an etheric oxygen atom, Q1 is an integer of from 2 to 10, and Q2 is an integer of from 2 to 10.

15. The fluorinated copolymer according to claim 1 wherein the one or more other monomers comprises $CH_2=CH(CF_2)_{Q1}F$, wherein Q1 is an integer of from 2 to 10.

16. The fluorinated copolymer according to claim 1 wherein the one or more other monomers comprise hexafluoropropylene (HFP) and $CH_2=CH(CF_2)_{Q1}F$; and wherein the molar ratio of hexafluoropropylene (HFP) to $CH_2=CH(CF_2)_{Q1}F$ (FAE) is from 85/5 to 95/5, wherein Q1 is an integer of from 2 to 10.

17. The fluorinated copolymer according to claim 1 comprising monomer units comprising tetrafluoroethylene (TFE), ethylene(E), functional groups (F), hexafluoropropylene (HFP), and $CH_2=CH(CF_2)_{Q1}F$ (FAE).

18. The fluorinated copolymer according to claim 17 wherein the ratio of all monomer units other than HFP (M1) to HFP monomer units is from 90/10 to 93/7.

* * * * *